June 24, 1947.  C. E. SOWERWINE  2,422,753
WEIGHT MOTOR AND POWER TRANSMISSION APPARATUS
Filed Oct. 2, 1944   4 Sheets-Sheet 1

Inventor
CHARLES E. SOWERWINE,

By Clarence A. O'Brien
and Harvey B. Jacobson
Attorneys

June 24, 1947. C. E. SOWERWINE 2,422,753
WEIGHT MOTOR AND POWER TRANSMISSION APPARATUS
Filed Oct. 2, 1944 4 Sheets-Sheet 3

Inventor
CHARLES E. SOWERWINE,

By Clarence A. O'Brien
and Harvey B. Jacobson
Attorney.

June 24, 1947.  C. E. SOWERWINE  2,422,753
WEIGHT MOTOR AND POWER TRANSMISSION APPARATUS
Filed Oct. 2, 1944  4 Sheets-Sheet 4

Inventor
CHARLES E. SOWERWINE,
By Clarence A. O'Brien
and Harvey B. Jacobson
Attorney Patented June 24, 1947

2,422,753

UNITED STATES PATENT OFFICE 2,422,753

WEIGHT MOTOR AND POWER TRANSMISSION APPARATUS

Charles E. Sowerwine, Ames, Iowa

Application October 2, 1944, Serial No. 556,771

2 Claims. (Cl. 185—33)

My invention relates to an apparatus in which power is generated by the lowering of weights, and in which the power is transmitted to an electrical generator through gearing and shafts equipped with momentum or flywheels, means being provided for automatically alternately elevating and allowing the weights to lower so as to continuously drive the electrical generator.

My invention consists in the novel combination and arrangement of devices as hereinafter described, shown in the accompanying drawings and claimed.

In the drawings, wherein like reference characters indicate corresponding parts throughout the several views.

Figure 1:
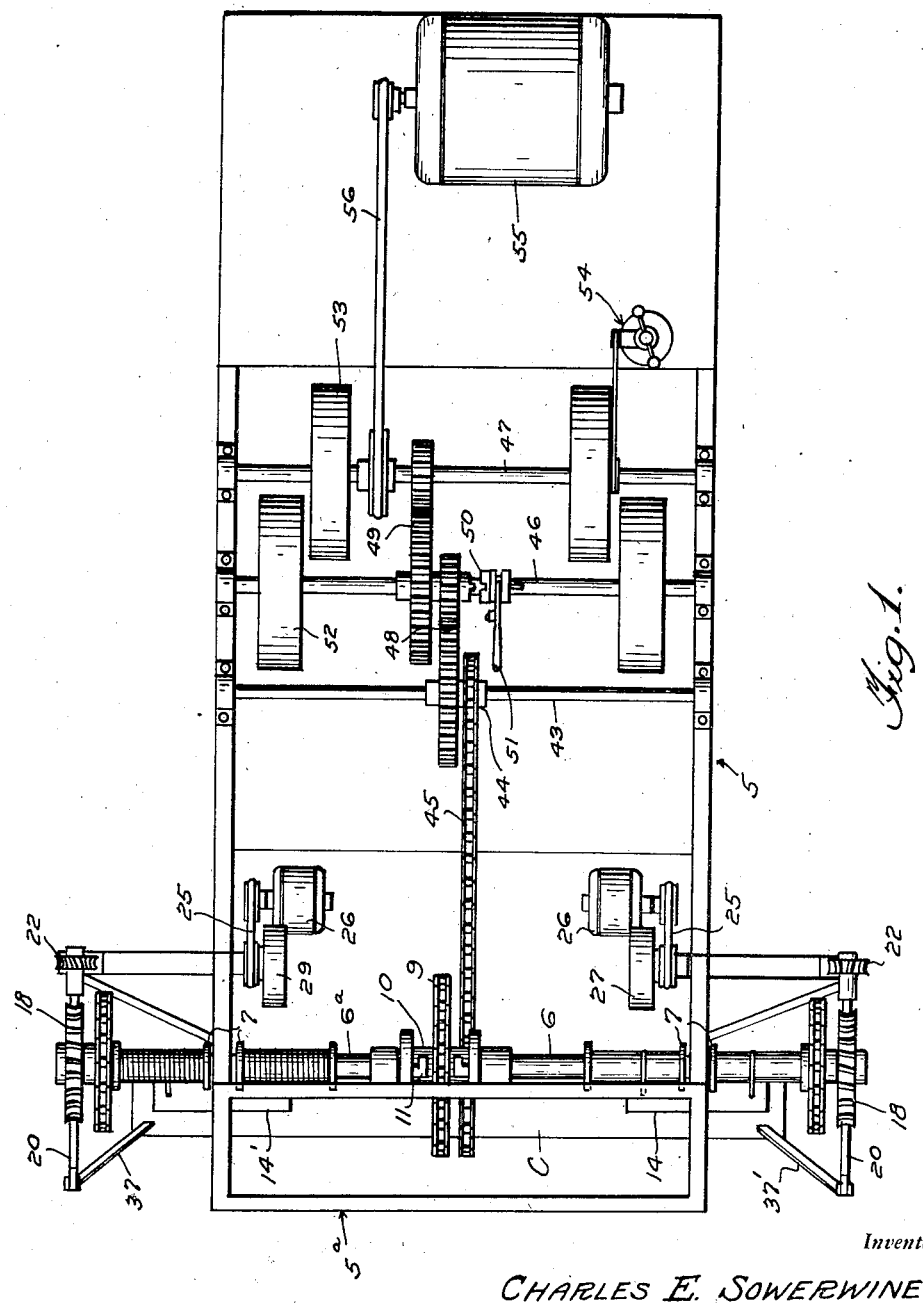
Figure 1 is a top plan view of an apparatus constructed in accordance with the present invention.
Figure 2:
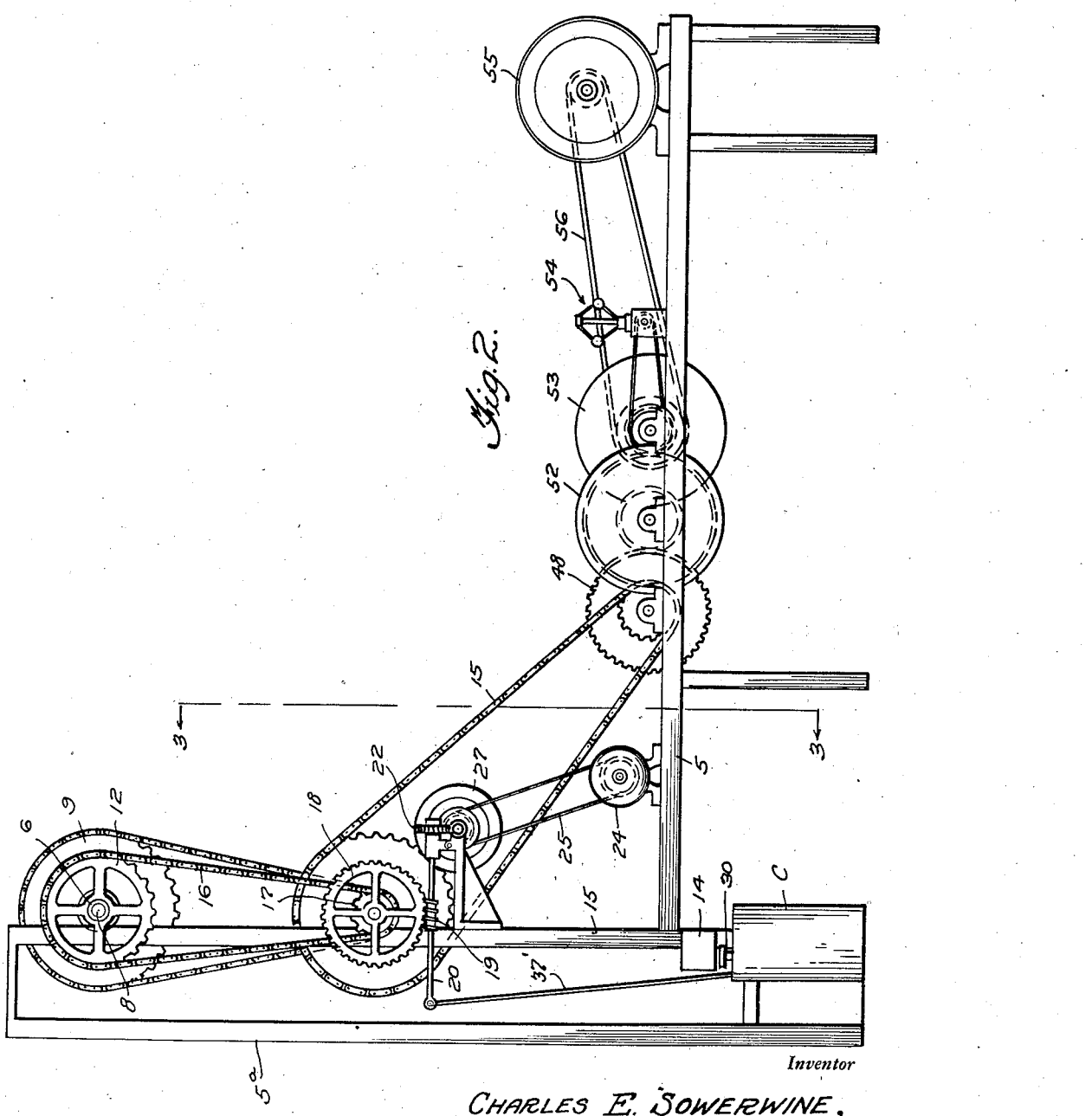
Figure 2 is a side elevational view thereof.
Figure 3:
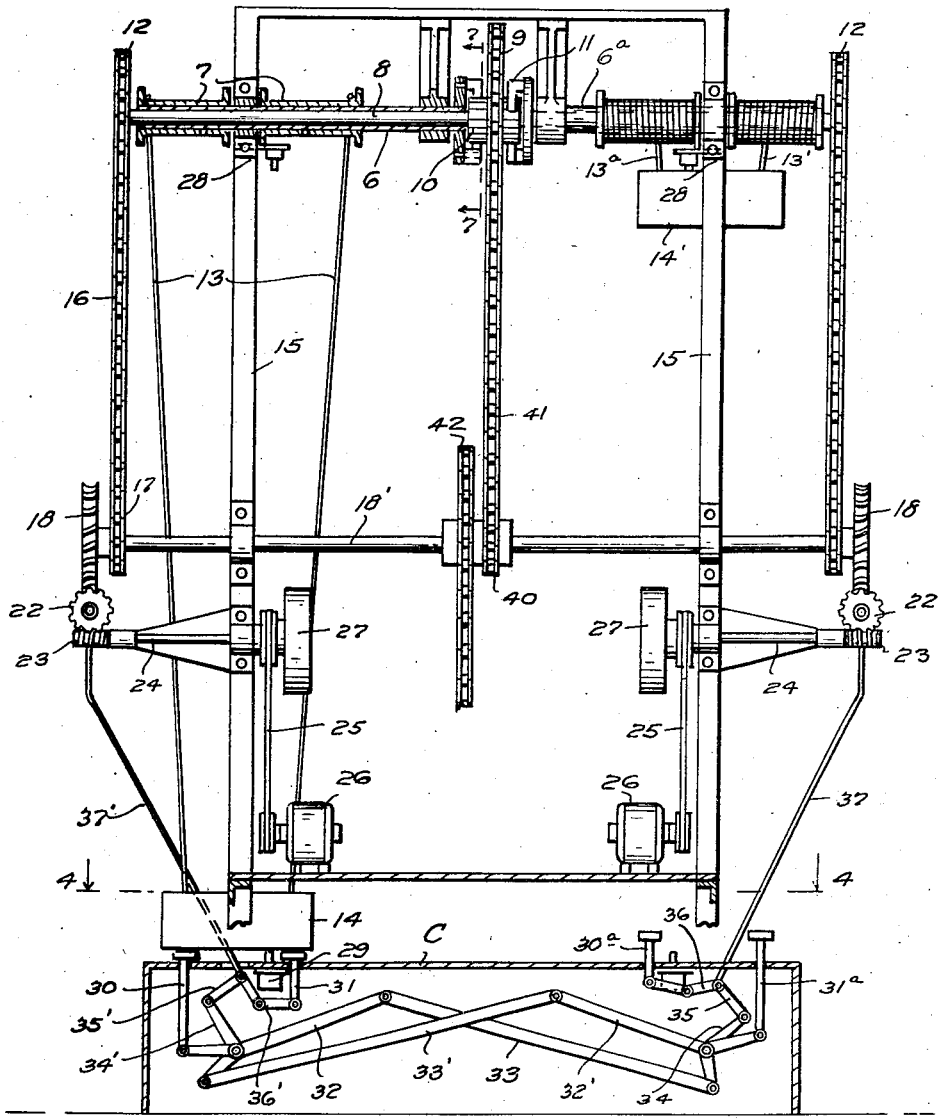
Figure 3 is a fragmentary vertical transverse section, partly broken away and taken substantially on line 3—3 of Figure 2.
Figure 7:
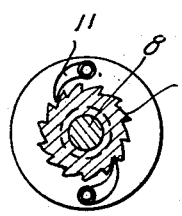
Figure 7 is a detail section taken on the plane of line 7—7 of Figure 3.
Figure 4:
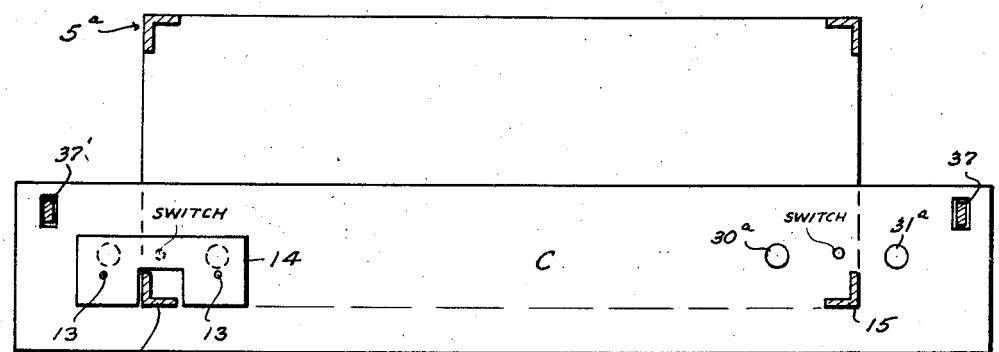
Figure 4 is a horizontal section taken on line 4—4 of Figure 3.
Figure 5:
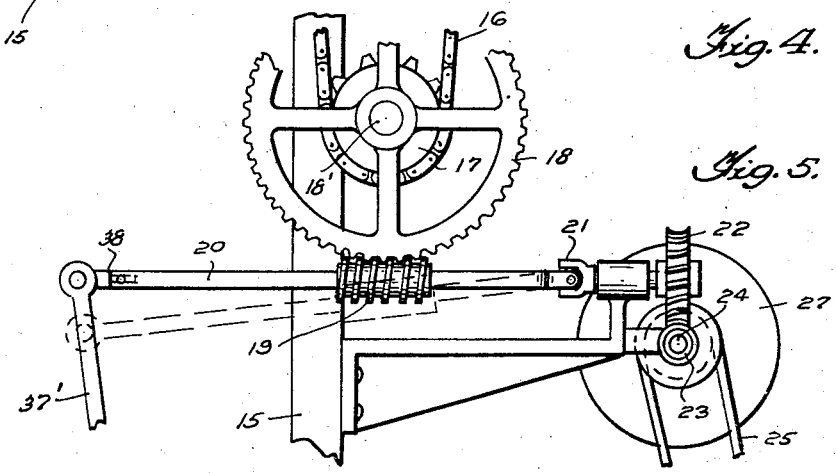
Figure 5 is an enlarged fragmentary side elevational view to more clearly illustrate details of the mechanism for raising the weights.

Referring in detail to the drawings, the present apparatus includes a suitable frame having an elongated low-built horizontal portion 5 having a vertically elongated upright portion 5a at one end thereof. Journaled on the upright frame portion 5a near the top thereof are transverse coaxial horizontal tubular shafts 6 and 6a, each having a pair of drums 7 secured thereon. Freely rotatable in the tubular shafts 6 and 6a is a shaft 8 having a sprocket gear 9 fixed thereon between the adjacent ends of said tubular shafts 6 and 6a. The hub of sprocket wheel 9 has ratchet wheels 10 at opposite sides thereof engaged by pawls 11 carried by the inner ends of said tubular shafts 6 and 6a. The arrangement is such that when tubular shafts 6 and 6a are rotated in one direction, rotation will be imparted therefrom to the shaft 8 and sprocket wheel 9 fixed on the latter, but rotation of shafts 6 and 6a is freely permitted relative to shaft 8 in the opposite direction. Each of the tubular shafts 6 and 6a has a sprocket wheel 12 fixed to the outer end thereof for a purpose which will later be made apparent. The drums 7 of shaft 6 have corresponding ends of cables 13 attached thereto, while the drums 7 of shaft 6a have the corresponding ends of cables 13' attached thereto, the other ends of cables 13 being attached to a weight 14 and the other ends of cables 13' being attached to a similar weight 14'. The weights 14 and 14' partially embrace and are slidable along vertical frame members 15 of the frame portion 5a. The arrangement is such that when the weights lower, they rotate shafts 6 and 6a in a direction to drive the shaft 8, and when the shafts 6 and 6a are rotated to wind the cables 13 and 13' on the drums 7, said shafts 6 and 6a rotate freely relative to shaft 8. Each sprocket wheel 12 has a sprocket chain 16 passed thereover, and around another sprocket wheel 17 rotatably mounted on the adjacent projecting end of a transverse shaft 18' journaled on the frame portion 5a below the shaft 8. A worm gear 18 is fixed to each sprocket 17 and meshes with a worm 19 fixed on a countershaft 20. The forward end of each shaft 20 is connected by a universal joint 21 with the stub shaft of a worm gear 22 meshing with a second worm 23 fixed on one end of a horizontal shaft 24 whose other end is operatively connected by a belt gearing 25 with a motor 26. Each shaft 24 preferably carries a flywheel 27, and it will be seen that shaft 20 may be shifted vertically, as indicated in Figure 5, to either engage or disengage the worm 19 with respect to the associated worm wheel 18. Suitable switches 28 are provided on the frame members 15 directly under the pairs of drums 7 to throw the respective motors 26 out of operation, and further switches 29 are mounted at the lower ends of the frame members 15 for throwing the respect motors 26 into operation. The arrangement is such that when weight 14 reaches its upper limit of movement by winding of cables 13 on the associated drums 7, said weight 14 will engage and operate switch 28 to throw the associated operating motor 26 out of operation, and when said weight 14 reaches its lower limit of movement, it will engage and operate switch 29 for throwing its operating motor 26 into operation. The same action takes place with respect to the switches 28 and 29 associated with weight 14'. As shown in Figure 3, a pair of vertically movable actuating rods 30 and 31 are movable through the top of a casing C and arranged to be depressed by the weight 14 when the latter approaches its lower limit of movement. Similar actuating rods 30a and 31a are provided in the path of the weight 14', and rod 30 is connected to a bell crank lever 32 which is in turn connected by a link 33 with a bell crank lever 34 connected by link 35 with a further bell crank lever 36, connected to the lower end of actuating rod 30a and the lower end of a push rod 37 attached to the worm shaft 20 forming part of the gearing between the drums of shaft 6a and the associated motor 26. In a like manner, the rod 31a is connected with bell crank lever 32' that is connected by link 33' with bell crank lever 34', and bell crank lever 34' is connected by link 35' with a bell crank lever 36'. Bell crank lever 36' and link 35' are connected with push rod 37' and with the lower end of actuating rod 31, said push rod 37' being connected with the worm shaft 20 of the gearing between the drums of shaft 6 and the associated actuating motor 26. A swivel connection is provided at 38 between each shaft 20 and the associated push rod 37 or 37', as shown more clearly in Figure 5, so that the connection of push rods 37 and 37' with the worm shafts 20 does not interfere with the free rotation of the latter at all times. The arrangement is such that when the weight 14' is elevated, as shown in Figure 3, the associated switch 28 will have been operated to throw the operating motor 26 for the drums of shaft 6a out of operation, and the weight 14 will have been lowered so as to actuate rods 30 and 31 to elevate rods 30a and 31a and to lower push rod 37 so as to disengage the associated worm 19 from its worm gear 18, thereby permitting the weight 14' to lower and impart rotation to shaft 8. At the same time, push rod 37' will have been elevated to engage the associated worm 19 with its worm gear 18 and the switch 29 associated with weight 14 will have been actuated to throw the motor 26, which operates the drums of shaft 6, into operation. Accordingly, while weight 14' is lowering, the cables 13 are being wound on drums 7 of shaft 6 to elevate weight 14. When weight 14 reaches its upper limit of movement, it actuates the associated switch 28 so as to throw the operating motor 26 out of operation which drives the drums of shaft 6, thereby stopping further elevation of said weight 14. As the worm 19 of the driving gearing for the drums of shaft 6 is engaged with its associated worm gear 18, the drums of shaft 6 are locked against turning so as to hold the weight 14 elevated. When the weight 14' subsequently approaches its lower limit of movement, it actuates rods 30a and 31a so as to elevate rods 30 and 31. This causes a downward pull on rod 37' so as to free the drums of shaft 6 and permit the weight 14 to again lower. At this time, weight 14' will also engage associated switch 29, and push rod 37 will be actuated to engage its worm 19 with its associated worm wheel 18. This results in operation of the motor 26 which drives the drums of shaft 6a so that the cables 13' are wound on the associated drums to again elevate weight 14'. Thus, the weights are automatically alternately elevated and permitted to lower so as to effect a substantially continuous driving of shaft 8 in the same direction.

A sprocket wheel 40 is rotatable on shaft 18', and a sprocket chain 41 passes around sprocket wheel 9 and sprocket wheel 40. A further sprocket wheel 42 is fixed to sprocket wheel 40 and freely rotatable on shaft 18', and mounted on the frame portion 5 forwardly of shaft 18' is a transverse horizontal shaft 43 having a sprocket wheel 44 fixed thereon. A sprocket chain 45 passes around the sprocket wheels 42 and 44 to drive the shaft 43, and rotation of shaft 43 is successively imparted to further transverse horizontal shafts 46 and 47 by means of spur gearings 48 and 49. Spur gearing 48 includes a gear which may be manually engaged with or disengaged from shaft 46 by means of a clutch 50 having an operating handle 51, and the shafts 46 and 47 preferably have pairs of flywheels 52 and 53 fixed thereon. Uniform rotation of shaft 47 is insured by a suitable centrifugal governing means generally indicated at 54, and rotation of shaft 47 is transmitted to an electrical generator 55 by means of a belt gearing 56. The generator 55 is mounted upon the forward end of frame portion 5, and the current derived from this generator may be suitably distributed for use as desired. The various flywheels provide momentum for the shafts on which they are fixed so as to cause rotation thereof to be continued for some time even after discontinuation of transmission of power thereto.

Figure 6:
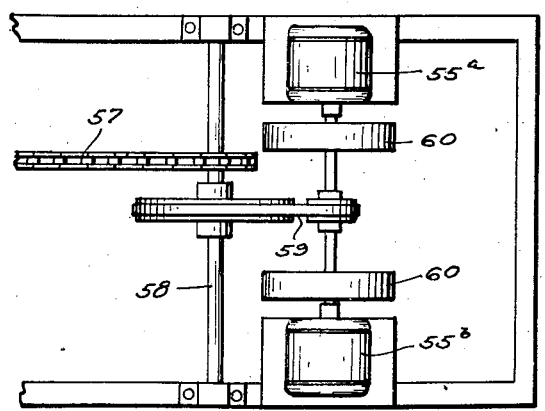
Figure 6 is a fragmentary plan view illustrating a modification of the apparatus whereby the power generated may be utilized to simultaneously drive a pair of generators.

As shown in Figure 6, a pair of generators 55a and 55b may have their shafts coupled together for being simultaneously driven from shaft 47 through a sprocket gearing 57 from shaft 47 to a countershaft 58 and a belt gearing 59 from countershaft 58 to the shafts of generators 55a and 55b. The shafts of generators 55a and 55b are also preferably provided with flywheels 60.

In operation, assuming that the parts are positioned as shown in Figure 3, the weight 14 is about to be elevated by winding cables 13 on the drums 7 of shaft 6, the weight 14 having actuated the associated switch 29 to throw the proper motor 26 into operation for driving said shaft 6 through the gearing described including worm gear 18 and worm 19, and said worm 19 having been engaged with its associated worm gear 18. At this time, the push rod 37 will have been lowered to disengage the worm 19 from the worm gear 18 of the gearing for driving shaft 6a, thereby permitting the weight 14' to lower. As the weight 14' gradually or slowly lowers, it turns shaft 6a and causes rotation of shaft 8 through the ratchet driving connection 11 associated therewith. This rotation of shaft 8 is then transmitted through the various gearings described to the generator 55 or generators 55a and 55b. As soon as weight 14' approaches its lower limit of movement, it will perform a similar operation to that described in connection with weight 14 so as to cause said weight 14' to again be elevated and so as to release weight 14 so as to permit the latter to lower and thereby continue the driving of shaft 8 through the ratchet driving connection between shaft 6 and shaft 8. Of course, when weight 14 approached its upper limit of movement, it actuated the associated switch 28 to throw the operating motor 26 out of operation which drives the shaft 6 for winding cables 13 on the drums 7 of said shaft 6. This alternate raising of the weights and permission of the same to lower continues as long as current is supplied to the motors 26.

From the foregoing description, it is believed that the construction and operation of the present apparatus will be readily understood by those skilled in the art.

What I claim is:

1. In an apparatus of the character described, rotatably mounted spaced co-axial tubular shafts, a winding drum fixed on each of said shafts, a cable attached to each drum, a weight suspended by each cable, means to operate each drum for winding its cable thereon and thereby raising the associated weight, each operating means including gearing and a driving motor therefor, each gearing including a worm wheel and a worm movable into and out of engagement with said worm wheel to respectively effect winding of the cable on the drum to raise the weight and to permit unwinding of the cable from the drum to allow the weight to lower by gravity, switch means operable by each weight upon approaching its upward limit of movement to throw the associated motor out of operation, further switch means operable by each weight upon approaching its lower limit of movement to throw the associated motor into operation, means operable by each weight upon approaching its lower limit of movement to engage the worm of its associated gearing with the worm wheel thereof and to simultaneously disengage the worm of the gearing associated with the other weight from the worm wheel thereof, whereby the weights will be automatically alternately raised and allowed to lower, a driven shaft journaled in said tubular shafts, a ratchet driving connection between each tubular shaft and said driven shaft to effect driving of the latter by each aubular shaft upon lowering of the weight associated with the latter, and means for transmitting power from said driven shaft including a train of gearing having countershafts, and flywheels on said countershafts.

2. In an apparatus of the character described, rotatably mounted spaced co-axial tubular shafts, a winding drum fixed on each of said shafts, a cable attached to each drum, a weight suspended by each cable, means to operate each drum for winding its cable thereon and thereby raising the associated weight, each operating means including gearing and a driving motor therefor, each gearing including a worm wheel and a worm movable into and out of engagement with said worm wheel to respectively effect winding of the cable on the drum to raise the weight and to permit unwinding of the cable from the drum to allow the weight to lower by gravity, switch means operable by each weight upon approaching its upward limit of movement to throw the associated motor out of operation, further switch means operable by each weight upon approaching its lower limit of movement to throw the associated motor into operation, means operable by each weight upon approaching its lower limit of movement to engage the worm of its associated gearing with the worm wheel thereof and to simultaneously disengage the worm of the gearing associated with the other weight from the worm wheel thereof, whereby the weights will be automatically alternately raised and allowed to lower, a driven shaft journaled in said tubular shafts, a ratchet driving connection between each tubular shaft and said driven shaft to effect driving of the latter by each tubular shaft upon lowering of the weight associated with the latter, and means for transmitting power from said driven shaft including a train of gearing having countershafts, and flywheels on said countershafts, said worm engaging and disengaging means including a push rod connected to each worm, a push rod operating rod arranged in the path of each weight, a second operating rod arranged in the path of each weight, and means operatively connecting the push rod operating rod associated with each weight with the second operating rod associated with the other weight, whereby said operating rods are automatically re-set for actuation by the weights.

CHARLES E. SOWERWINE.

REFERENCES CITED

The following references are of record in the file of this patent:

UNITED STATES PATENTS

| Number | Name | Date |
| --- | --- | --- |
| 207,403 | Driver | Aug. 27, 1878 |
| 994,840 | Hess | June 13, 1911 |
| 398,400 | Huckabay | Feb. 26, 1889 |
| 1,391,811 | Atherton | Sept. 27, 1921 |